US009776162B2

(12) United States Patent
Kumari et al.

(10) Patent No.: US 9,776,162 B2
(45) Date of Patent: Oct. 3, 2017

(54) CUO—TIO2 NANOCOMPOSITE PHOTOCATALYST FOR HYDROGEN PRODUCTION, PROCESS FOR THE PREPARATION THEREOF

(71) Applicant: Council of Scientific & Industrial Research, New Delhi (IN)

(72) Inventors: Valluri Durga Kumari, Hyderabad (IN); Machiraju Subrahmanyam, Hyderabad (IN); Basavaraju Srinivas, Hyderabad (IN); Gullapelli Sadanandam, Hyderabad (IN); Muthukonda Venkatakrish Nan Shankar, Kadapa (IN); Bethanabhatla Syama Sundar, Kadapa (IN); Murikinati Mamatha Kumari, Kadapa (IN); Dharani Praveen Kumar, Kadapa (IN)

(73) Assignee: Council of Scientific & Industrial Research, New Delhi (IN)

( * ) Notice: Subject to any disclaimer, the term of this patent is extended or adjusted under 35 U.S.C. 154(b) by 201 days.

(21) Appl. No.: 14/459,563

(22) Filed: Aug. 14, 2014

(65) Prior Publication Data
US 2016/0045908 A1 Feb. 18, 2016

(51) Int. Cl.
*B01J 19/12* (2006.01)
*B01J 35/00* (2006.01)
(Continued)

(52) U.S. Cl.
CPC ........... *B01J 19/123* (2013.01); *B01J 21/063* (2013.01); *B01J 23/72* (2013.01); *B01J 35/002* (2013.01);
(Continued)

(58) Field of Classification Search
CPC ........ B01J 21/063; B01J 19/123; B01J 35/06; B01J 23/72; B01J 37/08; B01J 37/342;
(Continued)

(56) References Cited

U.S. PATENT DOCUMENTS

2010/0213046 A1\* 8/2010 Grimes .................. B01J 35/004
204/157.52
2011/0059378 A1\* 3/2011 Chan .................... B01J 37/0203
423/648.1
(Continued)

OTHER PUBLICATIONS

Kumar et al, "Nano-size effects on CuO/TiO2 catalysts for highly efficient H2 production under solar light irradiation," Chem. Comm., 2013, vol. 49, pp. 9443-9445 and Electronic Supplementary Information.*

(Continued)

*Primary Examiner* — Keith Hendricks
*Assistant Examiner* — Colleen M Raphael
(74) *Attorney, Agent, or Firm* — Lewis Roca Rothgerber Christie LLP

(57) ABSTRACT

The present investigation is development of the $TiO_2$ nanotubes concept of preparation of and their composite with fine dispersion of copper. The inventions also relates to identify a method for optimum amount of photocatalyst required for efficient and maximum hydrogen production reported than earlier ($H_2$=99,823 $\mu mol \cdot h^{-1} \cdot g^{-1}$ catalyst) from glycerol-water mixtures under solar light irradiation. A method is disclosed to produce $CuO/TiO_2$ nanotubes with high sustainability and recyclable activity for hydrogen production.

2 Claims, 9 Drawing Sheets

(51) Int. Cl.
  B01J 23/72 (2006.01)
  B01J 21/06 (2006.01)
  C01B 3/04 (2006.01)
  B01J 37/02 (2006.01)
  B01J 37/03 (2006.01)
  B82Y 40/00 (2011.01)
  B82Y 30/00 (2011.01)

(52) U.S. Cl.
  CPC ........... *B01J 35/004* (2013.01); *B01J 35/006* (2013.01); *B01J 35/0013* (2013.01); *B01J 37/0207* (2013.01); *C01B 3/042* (2013.01); *B01J 37/031* (2013.01); *B82Y 30/00* (2013.01); *B82Y 40/00* (2013.01); *Y02E 60/364* (2013.01); *Y10S 977/762* (2013.01); *Y10S 977/811* (2013.01); *Y10S 977/896* (2013.01)

(58) Field of Classification Search
  CPC .... B01J 37/031; B01J 35/004; B01J 37/0207; B01J 35/006; B01J 35/002; B01J 35/0013; C01B 3/042; C01B 2203/1217; C01B 2203/1076
  USPC .................. 204/157.44, 157.5; 502/345, 5
  See application file for complete search history.

(56) References Cited

U.S. PATENT DOCUMENTS

| | | | |
|---|---|---|---|
| 2012/0214667 A1* | 8/2012 | Furudate | B01J 37/031 502/350 |
| 2012/0276464 A1* | 11/2012 | Kuroha | C01B 3/042 204/242 |
| 2014/0147377 A1* | 5/2014 | Ho | C01B 3/042 502/302 |
| 2015/0090604 A1* | 4/2015 | Artero | B01J 31/16 502/325 |

OTHER PUBLICATIONS

Kumar et al, "Solar Light Active CuO/TiO2 Nanobelt Photocatalyst for Enhanced H2 Production," Proceedings of the "International Conference on Advanced Nanomaterials & Emerging Engineering Technologies" (ICANMEET-20J3).*

Xu et al, "Highly efficient CuO incorporated TiO2 nanotube photocatalyst for hydrogen production from water," Intl J. of Hydrogen Energy, vol. 36 (2011) pp. 6560-6568.*

Yu et al, "Photocatalytic hydrogen production over CuO-modified titania," J. of Colloid and Interface Science, vol. 357 (2011), pp. 223-228.*

Yang et al, "Photocatalytic hydrogen generation of CuO and WO3 co-loaded TiO2 nanotubes," Applied Mechanics and Materials, vols. 110-116, pp. 3781-3785, published online Oct. 24, 2011.*

Chen et al, "Fabrication and Photoelectrochemical Properties of CuO/TiO2 Heterojunction Nanotubes Array Film," Key Engineering Materials, vol. 492, pp. 316-319, published online Sep. 7, 2011.*

Yang and Kim, "Photoelectrochemical Property, Photocatalytic Degradation and Photocatalysts for Hydrogen Production of CuO and WO3 Loaded TiO2 Nanotube," Int'l J. of Applied Physics and Mathematics, vol. 1, No. 1, Jul. 2011.*

Lalitha et al, "Highly Stabilized and Finely Dispersed Cu2O/TiO2: A Promising Visible Sensitive Photocatalyst for Continuous Production of Hydrogen from Glycerol: Water Mixtures," J. Phys. Chem. C 2010, vol. 114, pp. 22181-22189.*

Mazare et al, "Embedded Palladium Activation as a Facile Method for TiO2-Nanotube Nanoparticle Decoration: Cu2O-Induced Visible-Light Photoactivity," ChemistryOpen 2013, vol. 2, pp. 21-24.*

Chen et al, "The role of CuO in promoting photocatalytic hydrogen production over TiO2," Int'l J. of Hydrogen Energy col. 38 (2013) pp. 15036-15048.*

Yan et al, "Visible-light Illumination Enhanced Hydrogen Evolution on CuO Modified TiO2 Nanotube arrays/Ti Electrocatalyst," Advanced Materials Research vol. 772, pp. 343-348, available online Sep. 4, 2013.*

Gombac et al, "CuOx—TiO2 Photocatalysts for H2 Production from Ethanol and Glycerol Solutions," J. Phys. Chem. A 2010, vol. 114, pp. 3916-3925.*

\* cited by examiner

CUO—TIO2 NANOCOMPOSITE PHOTOCATALYST FOR HYDROGEN PRODUCTION, PROCESS FOR THE PREPARATION THEREOF

FIELD OF THE INVENTION

The present invention relates to CuO—$TiO_2$ nanocomposite photocatalyst for hydrogen production, process for the preparation thereof. Particularly, the present invention provides a process for largest volume of hydrogen production in high yield than reported till date under solar light irradiation using CuO/$TiO_2$ nanotubes photocatalyst. More particularly, the present invention relates to the hydrogen production under solar light irradiation using CuO/$TiO_2$ nanotubes photocatalyst from Glycerol:water mixture.

BACKGROUND OF THE INVENTION

The demand for a large volume of fuel for transportation sector, for industrial use and increasing modern societal life-style is mainly supplied by petroleum based derivatives. Both industrial processing of fossil resources and its commercial utilization damaged the environment. Since the steady increase in fossil fuel requirements and decrease in natural fossil resources are at alarming rate that have urged to go for alternative and renewable energy resources. To full-fill the future energy requirements (at the same time) development of eco-friendly process for hydrogen production occupies first place as it has proven as cleaner resource and significant improvement in energy efficiencies up to 60% compared to petroleum derived fuels (30-35%) in internal combustion engine.

Several methods are existing for hydrogen production like steam reforming of natural gas, partial oxidation of hydrocarbons, auto thermal reforming of glycerol, gasification of coal and biomass, photo biological production and photocatalytic water splitting [Acta Geodyn. Geomater, "The resources and methods of hydrogen production". Vol. 7, No. 2,158 (2010) pp 175-188, Chi-Hung Liao, Chao-Wei Huang and Jeffrey C. S. Wu, "Hydrogen Production from Semiconductor-based Photocatalysis via Water Splitting". Catalysts Vol. 2 (2012) pp. 490-516].

Some of the above methods require higher temperature and pressure the resources are non-renewable in nature and potential to damage the environment. Photocatalytic water splitting process demonstrated as promising one for hydrogen production as it works well under ambient conditions utilizing renewable resources like water, sunlight in the presence of semiconductor photocatalysts [M. Anpo and P. V. Kamat (Eds), "Environmentally Benign Photocatalysts: Applications of Titanium-oxide based Materials" Springer, New York (2010)]. Among the important criteria identified for efficient photocatalytic water splitting are: (i) energy band configuration and (ii) surface properties of semiconductor photocatalyst.

The energy bands were systematically tuned to their desired energy level by modulation of valence band and conduction band. The surface properties were controlled by facilitating charge-carriers transfer to the surface by using hybrid catalysts, composite catalysts, using noble metal loaded catalysts and nanostructured catalysts. They greatly influence the optical and surface properties of the photocatalyst.

Nano structured photocatalysts exhibited improved performance than nanoparticles in water splitting process [A. Kudo and Y. Miseki, "Heterogeneous Photocatalyst Materials for Water Splitting" Chem. Soc. Rev., Vol. 38 (2009) pp. 253-278; X. Chen, S. Shen, L. Guo and S. S. Mao, "Semiconductor-based Photocatalytic Hydrogen Generation" Chem. Rev., Vol. 110, (2010) pp. 6503-6570; H. Tong, S. Ouyang, Y. Bi, N. Umezawa, M. Oshikiri and J. Ye, "Nano-photocatalytic Materials: Possibilities and Challenges" Adv. Mater., Vol. 24 (2012) pp. 229-251; Y. Quab and X. F. Duan, "Progress, Challenge and Perspective of heterogeneous photocatalysts", Chem. Soc. Rev., Vol. 42 (2013) pp. 2568-2580; C. Huang, W. Yao, A. T. Raissi and N. Muradov, Development of efficient photoreactors for solar hydrogen production, Solar Energy, Vol. 85 (2011) pp. 19-27]. Particularly, 1-D $TiO_2$ nanostructure with tubular and hollow space inside (porous) is of great potential for photocatalysis applications [D. V. Bavykin, V. N. Parmon, A. A. Lapkin and F. C. Walsh, "The effect of hydrothermal conditions on the mesoporous structure of $TiO_2$ nanotubes", J. Mater. Chem., Vol. 14 (2004) pp. 3370-337]. Such catalysts showed a large surface area, extended energy band potential and electron delocalization along the uni-directional axis. Enhancement of $H_2$ production rate with $TiO_2$ nanostructures modified with dopents, sensitizers, co-catalysts and scavengers were reported [M. V. Shankar and J. Ye, "Inorganic alkaline-sols as precursors for rapid synthesis of ETS-10 microporous titanosilicates and their photocatalytic reforming of methanol under visible-light irradiation" Cat. Comm., Vol. 11 (2009) pp. 261-265; J. Krishna Reddy, G. Suresh, C. H. Hymavathi, V. Durga Kumari and M. Subrahmanyam, "Ce (III) species supported zeolites as novel photocatalysts for hydrogen production from water", Cat. Today. Vol. 141 (2009) pp. 89-93; Z. Jin, X. Zhang, Y. Li, S. Li and G. Lu, "5.1% Apparent quantum efficiency for stable hydrogen generation over eosin-sensitized CuO/$TiO_2$ photocatalyst under visible light irradiation" Catal. Commun., Vol. 8 (2007) pp. 1267-1273; L. Zhang, B. Tian, F. Chen and J. Zhang, "Nickel sulfide as co-catalyst on nanostructured $TiO_2$ for photocatalytic hydrogen evolution", Int. J. Hydrogen Energy, Vol. 37 (2012) pp. 17060-17067; F. Guzman, S. S. C. Chuang and C. Yang, "Role of Methanol Sacrificing Reagent in the Photocatalytic Evolution of Hydrogen", Ind. Eng. Chem. Res. Vol 52 (2013) pp. 61-65]. Copper based $TiO_2$ photocatalysts showed efficient $H_2$ generation superior to several noble-metal loaded $TiO_2$ systems [X. Qiu, M. Miyauchi, H. Yu, H. Irie and K. Hashimoto, "Visible-Light-Driven Cu(II)-($Sr_{1-y}Na_y$)($Ti_{1-x}Mo_x$)$O_3$ Photocatalysts Based on Conduction Band Control and Surface Ion Modification", J. Am. Chem. Soc., Vol. 132 (2010) pp. 15259-15267; H. Yu, H. Irie and K. Hashimoto, "Conduction Band Energy Level Control of Titanium Dioxide: Toward an Efficient Visible-Light-Sensitive Photocatalyst" J. Am. Chem. Soc., Vol. 132 (2010) pp. 6898-6899; S. Xu and D. D. Sun, "Significant improvement of photocatalytic hydrogen generation rate over $TiO_2$ with deposited CuO", Int. J. Hydrogen Energy Vol. 34 (2009) pp. 6096-6104; L. S. Yoong, F. K. Chong and B. K. Dutta, "Development of copper-doped $TiO_2$ photocatalyst for hydrogen production under visible light", Energy. Vol. 34 (2009) pp. 1652-1661; S. Xu, J. Ng, X. Zhang, X. Zhang, H. Bai and D. D. Sun, "Fabrication and comparison of highly efficient Cu incorporated $TiO_2$ photocatalyst for hydrogen generation from water", Int. J. Hydrogen Energy., Vol. 35 (2010) pp. 5254-5261; W. J. Foo, C. Zhang and G. W. Ho, "Non-noble metal Cu-loaded $TiO_2$ for enhanced photocatalytic $H_2$ production" Nanoscale, Vol. 5 (2013) pp. 759-764; W. Fan, Q. Zhang and Y. Wang, "Semiconductor-based nanocomposites for photocatalytic $H_2$ production and $CO_2$ conversion", Phys. Chem. Chem. Phys., Vol. 15 (2013) pp. 2632-2649. a) S. Xu, J. Ng, A. J.

Du, J. Liu and D. D. Sun, "Highly efficient $TiO_2$ nanotube photocatalyst for simultaneous hydrogen production and copper removal from water", *Int. J. Hydrogen Energy*, Vol. 36 (2011) pp. 6538-6545; H. Dang, X. Dong, Y. Dong, Y. Zhang and S. Hampshire, "$TiO_2$ nanotubes coupled with nano-$Cu(OH)_2$ for highly efficient photocatalytic hydrogen production", *Int. J. Hydrogen Energy*, Vol. 38 (2013) pp. 2126-2135; S. S. Lee, H. Bai, Z. Liu and D. D. Sun, "Novel-structured electrospun $TiO_2$/CuO composite nanofibers for high efficient photocatalytic cogeneration of clean water and energy from dye wastewater", *Wat. Res.* Vol. 47 (2013) pp. 4059-4073]. They possess significant advantages in photo conversion efficiency and promote electron-hole separation via interfacial charge transfer process. Copper oxide has several benefits such as narrow band-gap, stability, affordability and abundantly available in nature. Notably few publications on copper oxide based nano-$TiO_2$ exhibited high photocatalytic activity under solar light and UV light irradiation [K. Lalitha, G. Sadanandam, V. Durga Kumari, M. Subrahmanyam, B. Sreedhar and N.Y. Hebalkar, "Highly Stabilized and Finely Dispersed $Cu_2O/TiO_2$: A Promising Visible Sensitive Photocatalyst for Continuous Production of Hydrogen from Glycerol:Water Mixtures", *J. Phys. Chem. C* Vol. 114 (2010) pp. 22181-22189; S. Xu, A. J. Du, J. Liu, J. Ng and D. D. Sun, "Highly efficient CuO incorporated $TiO_2$ nanotube photocatalyst for hydrogen production from water", *Int. J. Hydrogen Energy* Vol. 36 (2011) pp. 6560-6568].

Disadvantage of the prior art reported here, the excitation source of catalyst is non-renewable that is Ultra-Violet (UV) light emitted by Hg lamp, which is non-renewable, total process is expensive due to various factors viz., lamps cost, its recycling, electricity, and to maintain reaction temperature, besides its deleterious effects such as carcinogenic and environmental concerns. [H. Kato, K. Asakura, and A. Kudo, "Highly Efficient Water Splitting into $H_2$ and $O_2$ over Lanthanum-Doped $NaTaO_3$ Photocatalysts with High Crystallinity and Surface Nanostructure", *J. Am. Chem. Soc.*, Vol. 125 (2003) pp. 3082-3089; A. Naldoni, M. D. Arienzo, M. Altomare, M. Marelli, R. Scotti, F. Morazzoni, E. Selli and V. D. Santo, "Pt and Au/$TiO_2$ photocatalysts for methanol reforming: Role of metal nanoparticles in tuning charge trapping properties and photoefficiency" *Appl. Catal. B*, Vol. 130-131 (2013) pp. 239-248; K. Lalitha, J. Krishna Reddy, M. V. P. Sharma, V. Durga Kumari and M. Subrahmanyam, "Continuous hydrogen production activity over finely dispersed $Ag_2O/TiO_2$ catalysts from methanol:water mixtures under solar irradiation: A structure-activity correlation", *Int. J. Hydrogen Energy* Vol. 35 (2010) pp. 3991-4001; G. Sadanandam, K. Lalitha, V. Durga Kumari, M. V. Shankar and M. Subrahmanyam, "Cobalt doped $TiO_2$: A stable and efficient photocatalyst for continuous hydrogen production from glycerol: Water mixtures under solar light irradiation", *Int. J. Hydrogen Energy* Vol. 38 (2013) pp. 9655-9664., D. Praveen Kumar, M. V. Shankar, M. Mamatha Kumari, G. Sadanandam, B. Srinivas, V. Durga Kumari, "Nano-size effects on CuO/$TiO_2$ catalysts for highly efficient $H_2$ production under solar light irradiation" *Chem. Commun.*, Vol. 49 (2013) pp. 9443-9446].

The catalyst synthesis involves harsh conditions, wherein $TiO_2$ (Degussa p-25) as precursor in 10M NaOH solution and heated at 150° C. for 48 h, with post-synthesis modification and 400° C. calcination temperature. The above $TiO_2$ precursor reported particle size 25 nm and is widely reported catalyst for various photocatalytic applications. $TiO_2$ (DegussP-25) cost INR 1500-1800 per kg, whereas $TiO_2$ μm-size (Merck, India) cost only INR 700-800 per kg. Hence use of $TiO_2$ (DegussP-25) is expensive one. For CuO/TiNT, they have reported 10 wt % of Cu/Ti ratio, that is very high compared to our report, 10% Methanol is used to improve photocatalytic performance. Moreover, methanol can be directly used as fuel in Direct Methanol Fuel Cell, which is more beneficial. Methanol is a well-known carcinogenic chemical and its usage is often restricted due to clean environmental concerns. The earlier report does not claim stability of the photocatalyst. In our report, we have used ambient conditions and natural solar (renewable energy) light as light source. We have synthesized $TiO_2$ micron-size particles (Merck) in 10 M NaOH solution and hydrothermally heated at 130° C. for 20 h & it was post-synthesis calcined at 350° C. and on the whole overall less time and lower temperature compared to previous report, that saves considerable amount of electrical energy, environment and cost as well. We have used industrial by-product glycerol as hole scavenger for enhanced $H_2$ production. Need of use of UV lamps which are cost effective for the process of hydrogen generation and their preparation involving adsorption and calcination method is also cost effective and reproducibility of catalyst and the recycle activity and leaching of copper are not mentioned. Whereas, the advantage of the present investigation is that metal loading by simple incipient wet impregnation and utilization of renewable source of energy i.e. natural Solar light. More over higher amount of hydrogen is produced than that of earlier report. No leaching of copper and 2 times recycle activity is observed.

SUMMARY OF THE INVENTION

The main objective of the present invention is to provide CuO—$TiO_2$ nanocomposite photocatalyst for hydrogen production, process for the preparation thereof.

Another objective of the present invention is to provide a process for hydrogen production under solar light irradiation using CuO/$TiO_2$ nanotubes photocatalyst.

Another objective of the present invention is to provide hydrogen production under solar light irradiation using CuO/$TiO_2$ nanotubes photocatalyst from Glycerol: water mixture.

Yet another objective of the present invention is to synthesis of highly efficient nanostructured photocatalysts for hydrogen production under solar light irradiation using glycerol-water mixtures.

Yet another objective of the present invention is to utilize renewable solar light as excitation source for semiconductor photocatalyst.

Yet another objective of the present invention is to produce largest volume of hydrogen.

Accordingly, the present invention provides CuO—$TiO_2$ nanocomposite photocatalyst which comprises of $TiO_2$ nanotubes in the range of 98-99.9 wt % and CuO in the range of 0.1 to 2 wt %.

In an embodiment of the present invention $TiO_2$ nanotube composed of bicrystalline anatase-rutile phase with tube length 300 to 400 nm and diameter 8-12 nm.

In one embodiment of the present invention CuO is deposited on $TiO_2$ nanotubes surface in the form of quantum dots.

In another embodiment of the present invention size of CuO quantum dots is less than 10 nm.

In another embodiment of the present invention a method for the preparation of CuO—$TiO_2$ nanocomposite photocatalyst, wherein the said process comprising the steps of:

a) dispersing TiO$_2$ µm-sized particles (TMP) into NaOH aqueous solution under magnetic stirring at temperature ranging between 25 to 35° C. for a period ranging between 0.5 to 2 h to obtain homogeneous suspension;

b) heating homogeneous suspension as obtained in step (a) into an autoclave for a period ranging between 6 to 72 h at temperature ranging between 120 to 150° C. to obtain precipitate of TiO$_2$ nanotube followed by washing with water, dilute HCl and ethanol in steps subsequently drying the precipitate at temperature ranging between 60 to 100° C. for a period ranging between 8 to 24 h then calcining TiO$_2$ nanotube at temperature ranging between 300 to 400° C. for a period ranging 2 to 7 h to obtain calcined TiO$_2$ nanotube;

c) dispersing calcined TiO$_2$ nanotube as obtained in step (b) into Cu(NO$_3$)$_2$.3H$_2$O aqueous solution followed by evaporating excess water to dryness with slow heating and constant magnetic stirring subsequently drying at 100-150° C. for 8 to 16 h and calcining at 300-400° C. for 3-6 h range to obtain CuO—TiO$_2$ nanocomposite photocatalyst.

Still in another embodiment of the present invention mol ratio of TiO$_2$ nanotube and Cu(NO$_3$)$_2$.3H$_2$O in step (c) used is in the range of 1.5 wt %.

Still in another embodiment of the present invention a process for H$_2$ production from glycerol-water mixture using CuO—TiO$_2$ nanocomposite photocatalyst as claimed in claim 1, wherein the said process comprises stirring CuO—TiO$_2$ nanocomposite photocatalyst with glycerol-water mixture (5 vol. % (3 to 7 vol. %)) for a period ranging between 0.5 to 2 h under dark condition at temperature ranging between 28-34° C. followed by evacuation and purged with N$_2$ gas subsequently stirring the solution under solar light for a period ranging between 1 to 4 h to obtain H$_2$ gas.

Still in another embodiment of the present invention H$_2$ production rate is in the range of 82,746 to 99,823 µmol·h$^{-1}$·g$^{-1}$ catalyst

BRIEF DESCRIPTION OF THE DRAWINGS

FIG. 1 shows X-ray diffraction patterns of TNP, TNT and CuTNT-4 materials that reveal the anatase-rutile mixed phase in TiO$_2$ with characteristic diffraction peaks (101) and (110) at 2θ=25.4 and 27.5 respectively. The CuO/TiO$_2$ photocatalyst showed intense peaks due to improved crystallinity and no characteristic peak exists for copper species due to fine dispersion of quantum sized particles.

FIG. 3 shows diffuse reflectance UV-Vis spectrum of photocatalysts that reveals TNT absorption which is slightly blue shifted compared with TNP due to quantum size effects. This has pushed the band edges and increased effective band gaps. The CuTNT-4 catalyst appears pale yellow-blue colour and showed extended absorption towards visible region, $E_g$=3.05 eV due to CuO content. The observed shift is likely due to nanoheterojunction formed between CuO and TNT interface.

In FIG. 4. The spectrum indicates the presence of Ti, O, Cu and C elements. The observed photoelectron peaks are at binding energies of 459.4 (Ti2p), 530.6 (O1s), 933.7 (Cu2p) and 284.6 eV (C1s). The observed atomic ratio of Ti to O is about 1:2, which is in good agreement with the nominal molecular composition of TiO$_2$. These binding energies indicate that the oxidation state of copper present on the surface of TiO$_2$ is +2. This is also in agreement with previous reports FIG. 5A is evaluation of photocatalytic activity for hydrogen generation using TiO$_2$ nanoparticles (TNP) under solar light irradiation. FIG. 5B is evaluation of photocatalytic activity for hydrogen generation using TiO$_2$ tubes (TNT) under solar light irradiation. FIGS. 5A and 5B display that on both TNP&TNT volume of H$_2$ generated with irradiation time and the best results are observed with 5 mg catalyst, where H$_2$ production is maximum 4625 µmoles h$^{-1}$ g$^{-1}_{cat}$ was observed on TNT. The present results reveal that ~10% of catalyst amount i.e. 0.1 g L$^{-1}$ is sufficient for efficient H$_2$ production rates under solar light irradiation. This is the best active photocatalyst system for H$_2$ production rate ever obtained using the smallest amount of photocatalyst. Similarly, earlier report demonstrates that doubled quantum yield at 0.5 to 0.05 g catalyst for highly efficient photocatalyst [H. Kato, K. Asakura, and A. Kudo, "Highly Efficient Water Splitting into H$_2$ and O$_2$ over Lanthanum-Doped NaTaO$_3$ Photocatalysts with High Crystallinity and Surface Nanostructure", *J. Am. Chem. Soc.*, Vol. 125 (2003) pp. 3082-3089]. Thus, our invention indicates that our catalyst is well-dispersed at optimal catalyst amount resulting in effective light utilization for oxidation-reduction reactions.

FIG. 6 displays optimization of copper with TNT catalysts for efficient H$_2$ generation. Amount of catalyst taken 100 mg. It is observed that increase in copper loading results in higher H$_2$ production up to 1 wt %, beyond which the opposite effect was observed. Above the monolayer dispersion, agglomeration of copper species on nanotubes surface may produce large size CuO nanoparticles having low band potential, which is inefficient for H$_2$ production besides light screening effect. At optimized conditions H$_2$ production rate was found to be 9389 µmoles h$^{-1}$g$^{-1}_{cat}$.

FIG. 7 displays optimization of copper with TNT catalysts for efficient H$_2$ generation. Amount of catalyst taken 0.005 g. It is observed that increase in copper loading results in higher H$_2$ production up to 1.5 wt %, beyond which the opposite effect was observed. Above the monolayer dispersion, agglomeration of copper species on nanotubes surface may produce large size CuO nanoparticles having low band potential, which is inefficient for H$_2$ production besides light screening effect. At optimized conditions H$_2$ production rate was found to be 99, 823 µmoles h$^{-1}$g$^{-1}_{cat}$.

FIG. 8 displays comparison of different photocatalysts for H$_2$ generation under solar irradiation. The efficiency of photocatalytic $H_2$ generation is in the order of CuTNT-4>TNT>TNP. In TNP photocatalyst, majority of the generated charge carriers undergo fast recombination and only a fraction of them utilized for $H_2$ generation. The observed significant improvement in $H_2$ evolution is likely due to delocalization of electrons along the axis of nanotube. CuTNT-4 exhibited largest $H_2$ production as a cumulative effect of photogenerated electrons and efficient transfer of electrons to CuO sites followed by proton reduction. It is the best photocatalytic $H_2$ evolution rate ever obtained on Ti-based catalysts which is about five times larger than the best reported values so far using glycerol as sacrificial agent. This has favourable band-edges that straddle the redox potential of water photo electrolysis and also exhibit stability and recyclability in the literature compared with similar earlier materials (Table 1).

FIG. 9 shows evaluation and sustainability of the photocatalysts tests which were also conducted by evacuating the produced gases at regular intervals (4 h). A continuous and stable photocatalytic activity is observed. The greater activity of CuTNT-4 is seen, compared to our earlier results on $Cu_2O/TiO_2$ composite is due to nanosized effects.

FIG. 10 depicts possible mechanism for highly efficient $H_2$ production under solar irradiation using CuTNT-4 photocatalysts is as follows: The band potential of CuTNT-4 itself sufficient for protons reduction to $H_2$ generation. The photogenerated electrons are transferred from CB of $TiO_2$ nanotube to CuO nanoparticles, due to lower potential of the CB energy level. Accumulation of excess electrons at CuO causes negative shift in the Fermi level that leads to $Cu_2O$ formation. This facilitated interfacial electron transfers from $Cu_2O$ to $H^+$ in solution resulting $H_2$ production. Meanwhile accumulation of holes in the VB of CuO/$Cu_2O$ and $TiO_2$ could be consumed by the sacrificial agent glycerol or generating hydroxyl radical (.OH) reaction with $H_2O$ molecules. Consequently, this process reduced the recombination of photogenerated electron-hole pairs and facilitated enhanced rate of $H_2$ production.

DETAILED DESCRIPTION OF THE INVENTION

Figure 1:
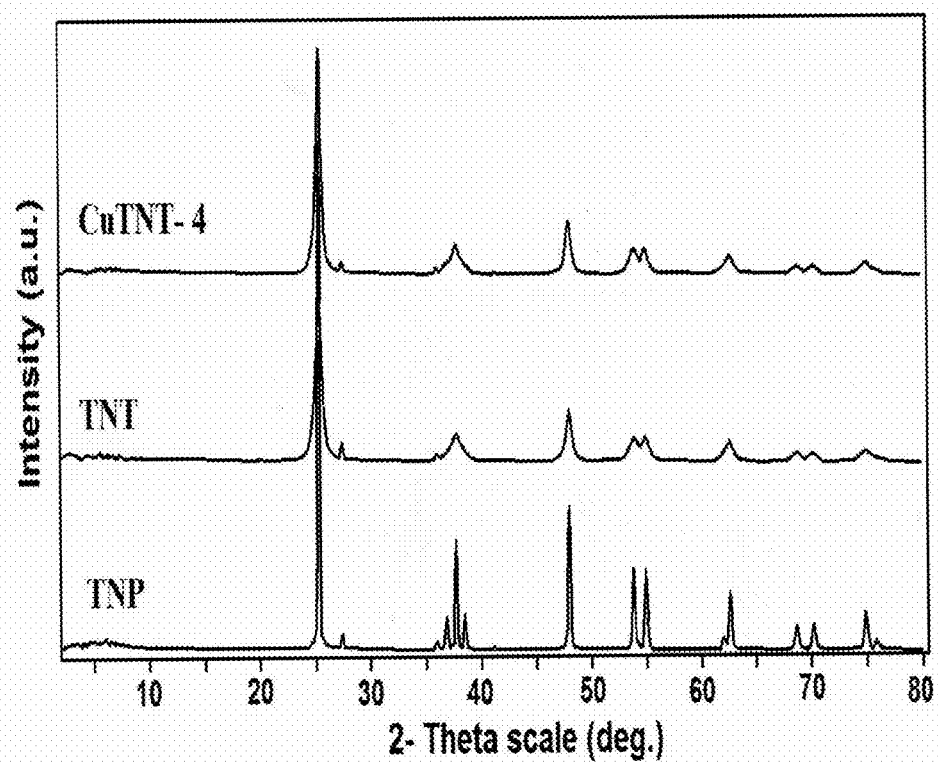
FIG. 1 is an X-ray diffraction pattern of pristine and CuO modified TiO$_2$ nanotube.

The present invention relates to CuO—$TiO_2$ nanocomposite photocatalyst for hydrogen production, process for the preparation thereof. Further, the present invention provides a process for hydrogen production in high yield than reported earlier under solar light irradiation using CuO/$TiO_2$ nanotubes photocatalyst. Further, the invention is directed to synthesize nanostructured $TiO_2$ based photocatalysts with desired morphology that are exhibiting improved conducting properties in overcome the rapid recombination of photogenerated charge carriers and their effective utilization in water splitting using glycerol as scavenger.

The present invention relates to synthesis of one dimensional $TiO_2$ nanotube having tubular structure and hollow space having great potential in photocatalysis due to a large surface area, extended energy band potential and fast electron delocalization along the uni-directional axis which exhibits higher hydrogen production efficiency. Yet another aspect is $TiO_2$ nanotube exhibits improved photocatalytic efficiency for hydrogen generation than $TiO_2$ nanoparticles.

Another aspect of the invention is to use of non-noble metal as inorganic sensitizer as well as co-catalyst (dual role) for efficient solar light harvesting and also for enhanced hydrogen production. The non-noble metal changes its oxidation state from CuO to $Cu_2O$ under band gap irradiation.

Yet another aspect of the invention is to improve the photocatalytic efficiency of semiconductor nanocomposites with appropriate band potential in-turn to improve the oxidation-reduction reactions with glycerol-water mixture to generate hydrogen. The method involves non-noble metal as co-catalyst to enhance the charge transfer properties and increase the hydrogen production rate efficiency.

The other aspect of the photocatalytic efficiency improvement is band-gap tuning with narrow and wide band gap semiconductors nanocomposite that facilitates utilization of solar light with low energy photon harvesting. Copper plays dual role both as visible light sensitizer and as co-catalyst for enhanced hydrogen production.

Another aspect of the invention is a method of synthesis of the photocatalyst and it includes the steps: (a) The use of micron-sized $TiO_2$ as precursor that do not exhibit any photocatalytic activity under solar light irradiation, (b) use of aqueous NaOH solution used as mineralizing agent, (c) stainless steel autoclave for hydrothermal synthesis conditions, (d) Thus the as synthesized material consists of amorphous and crystalline phases and on further calcination improves crystallinity Another aspect of the invention is use of amount of photocatalyst for enhanced hydrogen production using $TiO_2$ nanoparticles from 3 to 100 mg. The enhanced hydrogen production efficiency observed at lower quantities whereas, with increasing in amount of catalyst the hydrogen generation drastically affected.

Yet another aspect of the invention is that when the amount of the catalyst was varied from 0.003 to 0.100 g using calcined $TiO_2$ nanotubes best photocatalytic activity for hydrogen generation was observed at optimal catalyst amount.

Yet another aspect of the invention is deposition of copper oxide on photocatalyst surface by wet impregnation method using $Cu(NO_3)_2$ from 0.1 to 5 wt %. The copper concentration (effect of copper loading) and its fine dispersion over titania nanotubes and its interaction with nanotube along the axis and inside the nanotube for enhanced hydrogen production. Beyond the optimized amount particle size of copper oxide increases bigger and that modified the band potential for hydrogen evolution.

Yet another aspect of the invention is characterization of photocatalyst for structure-activity relationship using different techniques such as XRD, TEM and XPS spectra.

Another aspect of the invention is photocatalytic experiments that include irradiating glycerol-water mixture under solar light irradiation and the hydrogen produced is analyzed off-line using gas chromatograph.

Yet another aspect of the invention is that among the reported $TiO_2$-based photocatalysts as well as solar light active photocatalysts, CuO/$TiO_2$ catalyst excited under UV-Visible band of solar light reports largest volume of hydrogen production $H_2$=99,823 $\mu mol \cdot h^- \cdot g^{-1}$ catalyst.

Yet another aspect of the invention is to verify the stability and sustainability of the photocatalyst for hydrogen production. After photocatalytic activity test under solar light irradiation, the same system was kept under dark and degassed and purged with nitrogen before solar experiment for the $2^{nd}$ day. The catalyst showed reproducible results for hydrogen production.

EXAMPLES

Following are the examples given to further illustrate the invention and should not be construed to limit the scope of the present invention.

Example-1

Synthesizing $TiO_2$ Nano Tube (TNT)

In a typical synthesis process, $TiO_2$ (Merck) 0.1 μm average sized particles (TMP) (2.5 g) was dispersed into 10 M NaOH (200 mL) aqueous solution under magnetic stirring for 1 h at 32±2° C. The homogeneous suspension was transferred into 250 mL teflon-lined autoclave and fitted with nuts and bolts. Then, the autoclave was kept in hot air oven at 130° C. for 20 h. The autoclave was removed from the oven and cooled-down to room temperature under tap water flow. At room temperature the autoclave was opened, discarded supernatant solution from white precipitate. Thus obtained white precipitate was subjected to washing in 3 steps under magnetic stirring for 2 hours and each step repeated twice: the precipitate was washed in distilled water, followed by 0.1 M HCl and absolute ethanol. Further, washed precipitate was subjected to drying in oven at 80° C. for 12 h and calcined at 350° C. for 5 h @ 2° C./min.

Figure 2:
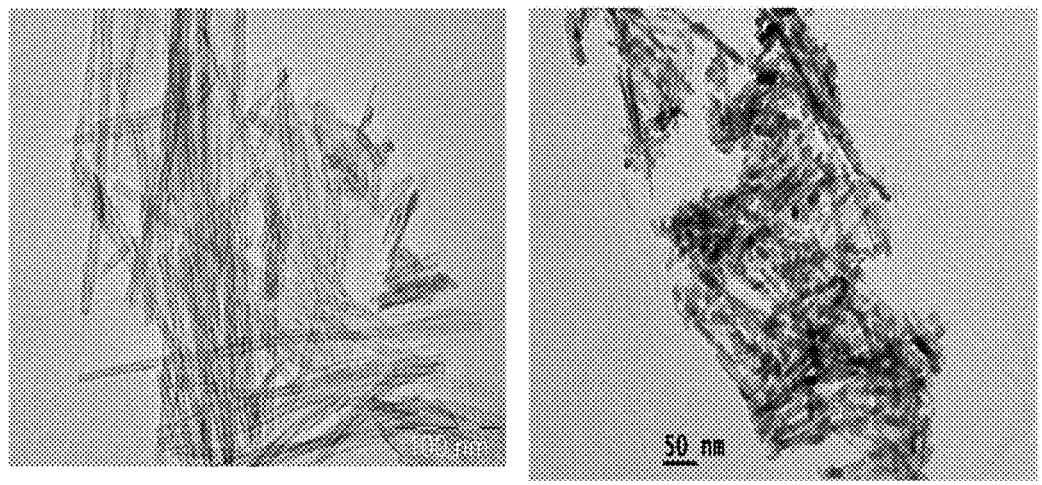
FIG. 2 is a TEM image of (a) TiO$_2$ nanotubes and (b) CuO/TiO$_2$ nanotubes (c) TiO$_2$ (Merck) particles with average particle size 01 µm (TMP) FIG. 2 (a) TEM image showing TNT hollow nature and open-ends on both sides. The lengths and diameters of tube are 300 to 400 nm and 8-12 nm respectively. TEM image (b) of CuTNT-4 showed clear evidence for CuO quantum dots (<10 nm) deposited on surface of nanotubes without damaging the tubular structure.
Figure 2:
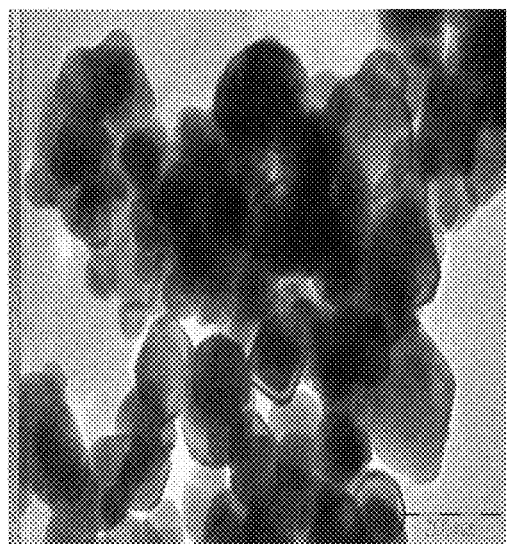
Figure 3:
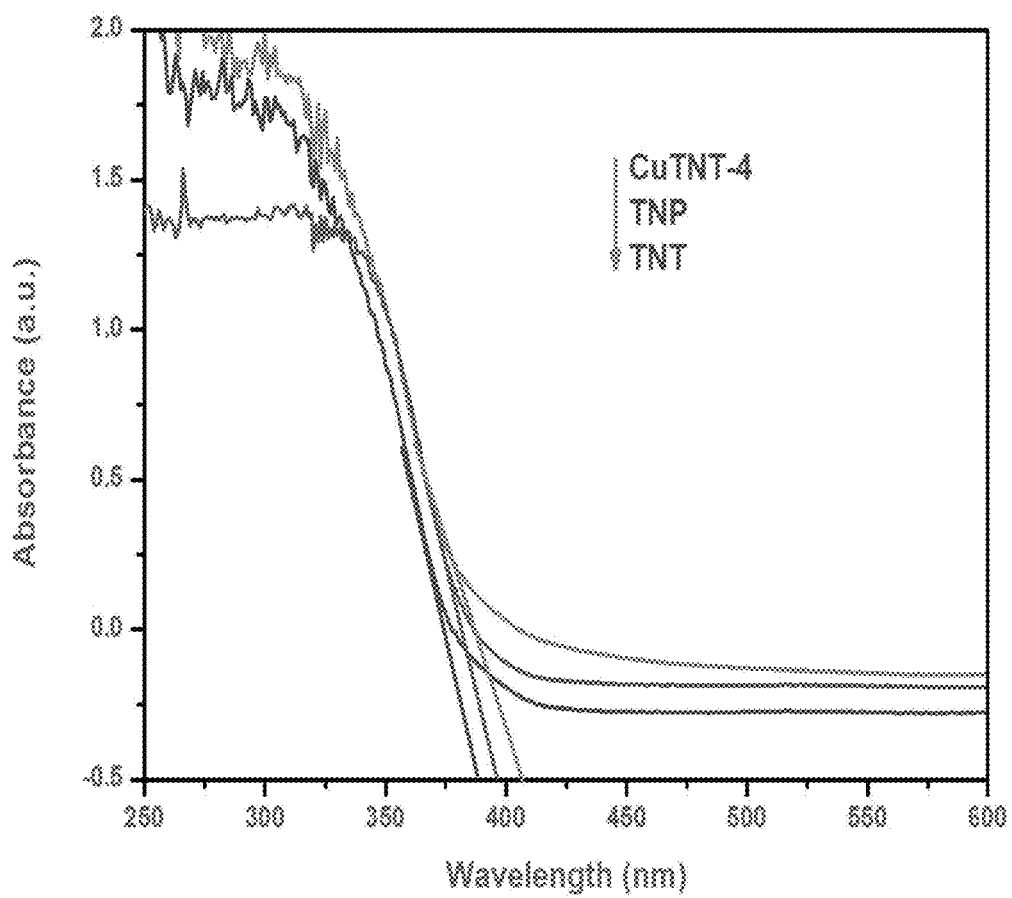
FIG. 3 is a DRS UV-Vis spectrum of TNP, TNT and CuTNT-4 photocatalysts.
Figure 4:
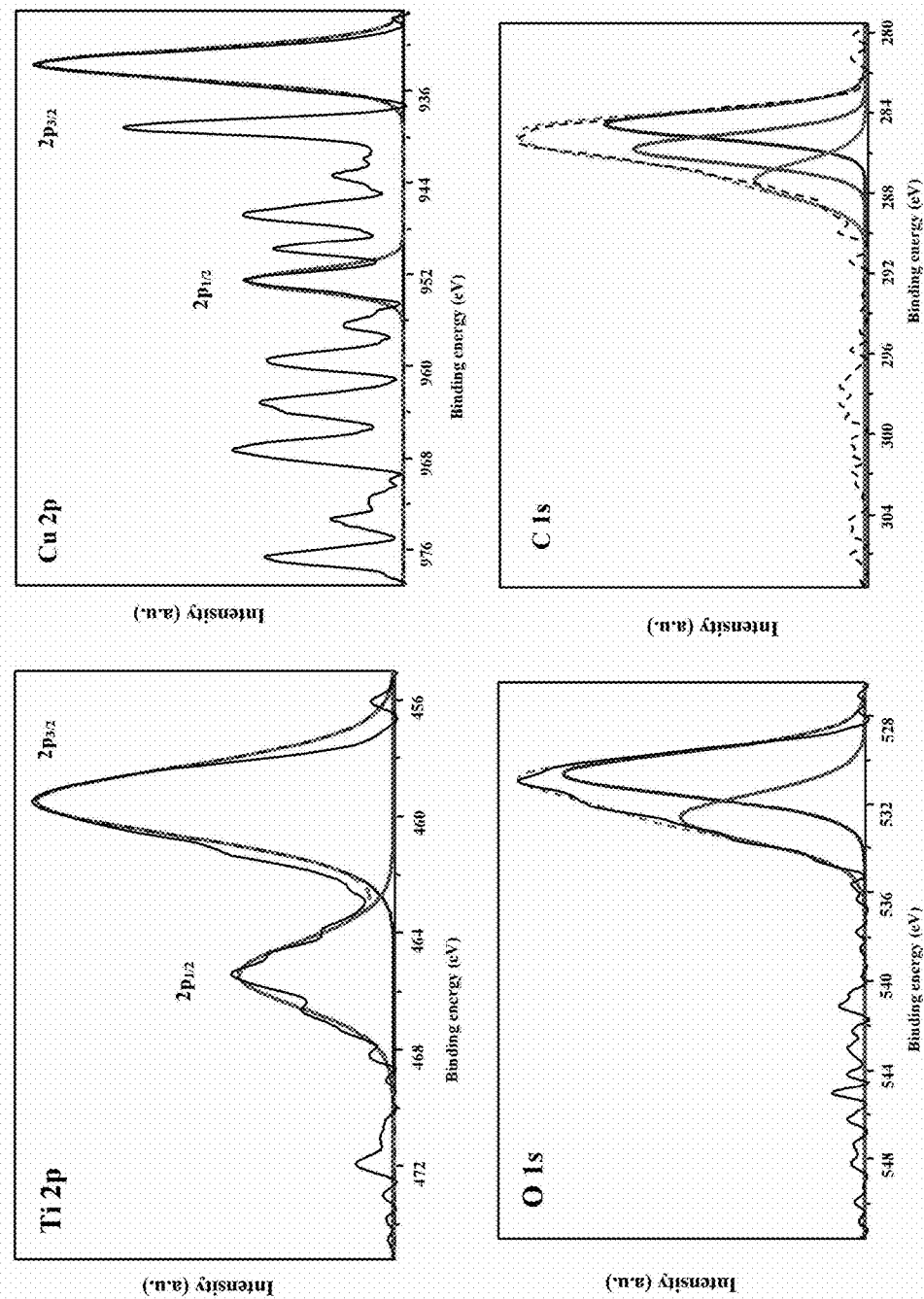
FIG. 4 is XPS spectrum of CuTNT-4 photocatalysts.

The X-ray diffraction (XRD) patterns (FIG. 1) of Cu-modified $TiO_2$ nanotube catalysts (Cu-TNT-4) were recorded with Siemens D-5000 X-ray diffract meter using Cu Kα radiation. A Philips Technai G2 FEI F12 transmission electron microscope operating at 80-100 kV was used to record the transmission electron microscopy (TEM) patterns (FIG. 2). The Diffuse Reflectance UV-Visible spectra (FIG. 3) were recorded on a GBC UV-visible Cintra $10_e$ spectrometer, in the wavelength 200-800 nm range. X-ray photoelectron spectra (FIG. 4) (XPS) were recorded on a KRATOS AXIC 165 equipped with Mg Kα radiation. All binding energies were referenced to C1s at 284.8 eV. BET surface area and pore size distribution were determined at liquid nitrogen temperature (77 K) using a Micromeritics ASAP 2010 system.

Example-2

Preparation of CuO Dispersed $TiO_2$ NT

Wet impregnation method of preparation was used for CuO dispersion on $TiO_2$ NT (CuTNT-4). For each Cu modified sample, required amount of $TiO_2$ nanotube (0.5 g) was dispersed into $Cu(NO_3)_2 \cdot 3H_2O$ (0.028 g, 1.5 wt %, 10 mL water) concentration aqueous solution for 1 h at 110±2° C. Excess water was evaporated to dryness with slow heating and constant magnetic stirring. The sample was dried at 110° C. for at least 12 h and calcined at 350° C. for 5 h.

The X-ray diffraction (XRD) patterns (FIG. 1) of Cu-modified $TiO_2$ nanotube catalysts were recorded with Siemens D-5000 X-ray diffract meter using Cu Kα radiation. A Philips Technai G2 FEI F12 transmission electron microscope operating at 80-100 kV was used to record the transmission electron microscopy (TEM) patterns (FIG. 2). The Diffuse Reflectance UV-Visible spectra (FIG. 3) were recorded on a GBC UV-visible Cintra $10_e$ spectrometer, in the wavelength 200-800 nm range. X-ray photoelectron spectra (FIG. 4) (XPS) were recorded on a KRATOS AXIC 165 equipped with Mg Kα radiation. All binding energies were referenced to C1s at 284.8 eV. BET surface area and pore size distribution were determined at liquid nitrogen temperature (77 K) using a Micromeritics ASAP 2010 system.

Example-3

Figure 5A:
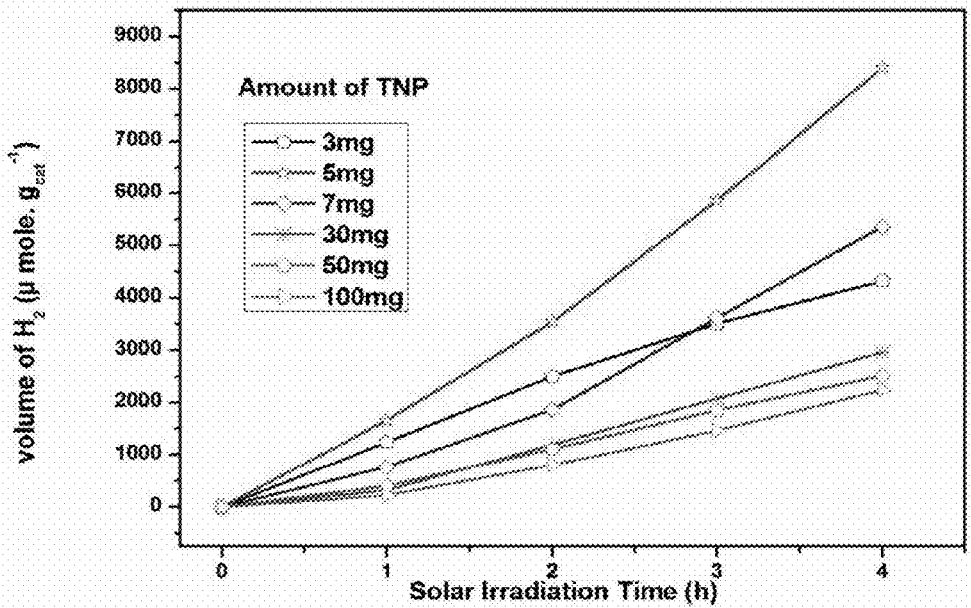
FIGS. 5A and 5B are evaluations of photocatalytic activity for hydrogen generation using solar light irradiation. Catalyst amount from 0.003 to 0.100 g.
Figure 5B:
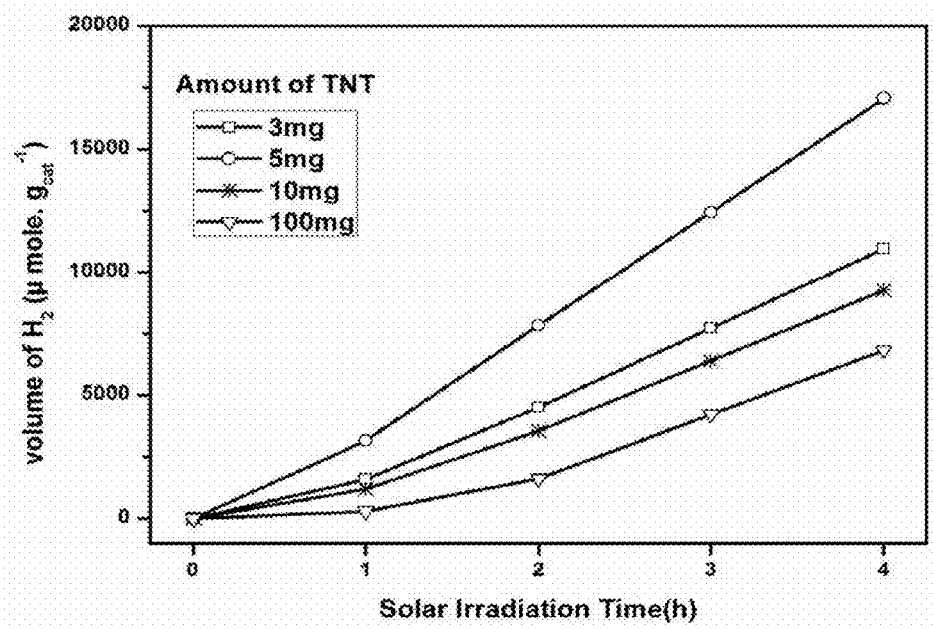

Photocatalytic Hydrogen Production from $TiO_2$ NP (TNP) and $TiO_2$ NT (TNT) Using Hole Scavenger Under Solar Irradiation The photocatalytic $H_2$ production experiments were carried out in a sealed quartz reactor (volume: 150 ml) using industrial by-product as scavenger at ambient temperature and pressure under natural solar irradiation on the terrace of Nanocatalysis Research Lab YVU Kadapa. $TiO_2$ nanoparticles and $TiO_2$ nanotubes were used separately as photocatalysts in this study. Powdered photocatalyst was suspended in 5 vol. % glycerol-water mixture (50 mL). In order to have better adsorption by the reaction mixture, it was magnetically stirred for 1 h at 32±2° C. under dark condition by covering with aluminium foil followed by evacuation and purged with $N_2$ gas Further, solar Photocatalytic experiments were conducted after removal of aluminium foil and kept on a four point magnetic stirrer (up to 4 quartz reactors can be accommodated for solar experiments) to ensure homogeneity of the suspension during reaction. Thus produced gases were collected at fixed intervals (every 1 h) and analysed using an off-line Gas Chromatograph with TCD detector (Shimadzu GC-2014 with Molecular Sieve/5 A) using $N_2$ as a carrier gas. (FIG. 5A and FIG. 5B)

Example-4

Photo Catalytic Hydrogen Production from CuO Dispersed on $TiO_2$ NT (Cu-TNT-4)

The photocatalytic $H_2$ production experiments (FIG. 6) were carried out in a sealed quartz reactor (volume: 150 ml) using industrial waste glycerol as scavenger at ambient temperature and pressure under natural solar irradiation on the terrace of Nanocatalysis Research Lab YVU Kadapa.

Figure 6:
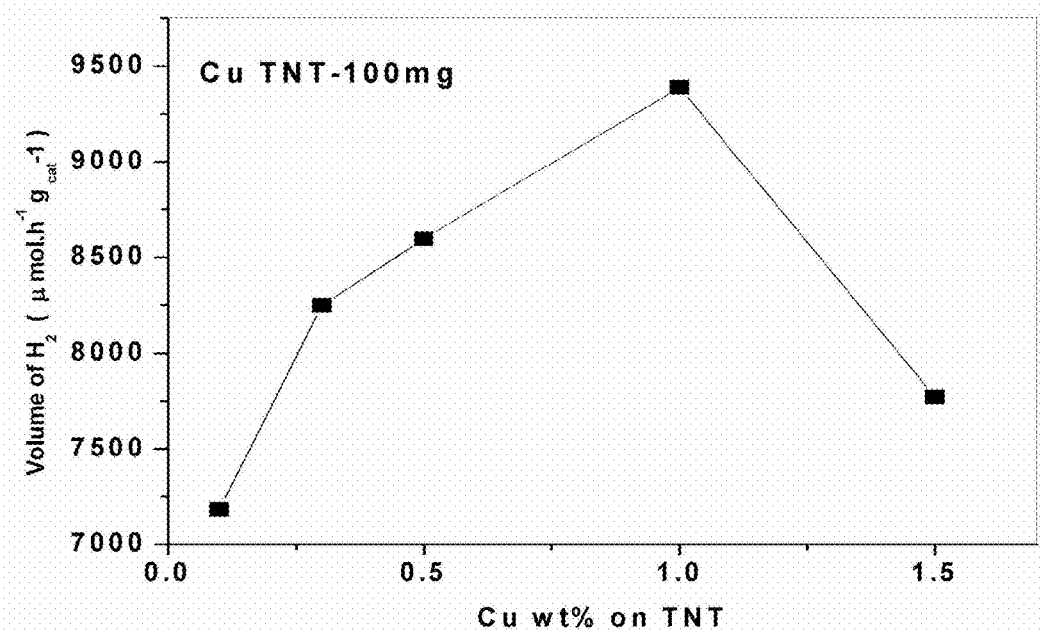
FIG. 6 is effect of copper loading on photocatalytic activity of CuO/TiO$_2$ nanotubes for hydrogen generation under solar light irradiation.

Powdered photocatalyst (0.005 g) was suspended in 5 vol. % glycerol water mixture (50 mL). In order to have better adsorption by the reaction mixture, it was magnetically stirred for 1 h at 32±2° C. under dark condition by covering with aluminium foil followed by evacuation and purged with $N_2$ gas. Further, solar Photocatalytic experiments were conducted after removal of aluminium foil and kept on a four point magnetic stirrer (up to 4 quartz reactors can be accommodated for solar experiments) to ensure homogeneity of the suspension during reaction. FIG. 6 displays optimization of copper with TNT catalysts for efficient $H_2$ generation. It is observed that increase in copper loading results in higher $H_2$ production up to 1.5 wt %, beyond which the opposite effect was observed. Above the monolayer dispersion, agglomeration of copper species on nanotubes surface may produce large size CuO nanoparticles having low band potential, which is inefficient for $H_2$ production besides light screening effect. At optimized conditions $H_2$ production rate was found to be 99, 823 μmoles $h^{-1} g^{-1}_{cat}$. Thus produced gases were collected at fixed intervals (every 1 h) and analysed using an off-line Gas Chromatograph with TCD detector (Shimadzu GC-2014 with Molecular Sieve/5 A) using $N_2$ as a carrier gas.

Example-5

Photo Catalytic Hydrogen Production Using Hole Scavenger Over CuO TiO$_2$ NT (Cu-TNT-4) for Under Solar Irradiation The photo catalytic H$_2$ production experiments (FIG. 7) were carried out in a sealed quartz reactor (volume: 150 ml) using industrial waste glycerol as scavenger at ambient temperature and pressure under natural solar irradiation on the terrace of Nanocatalysis Research Lab YVU Kadapa.

Figure 7:
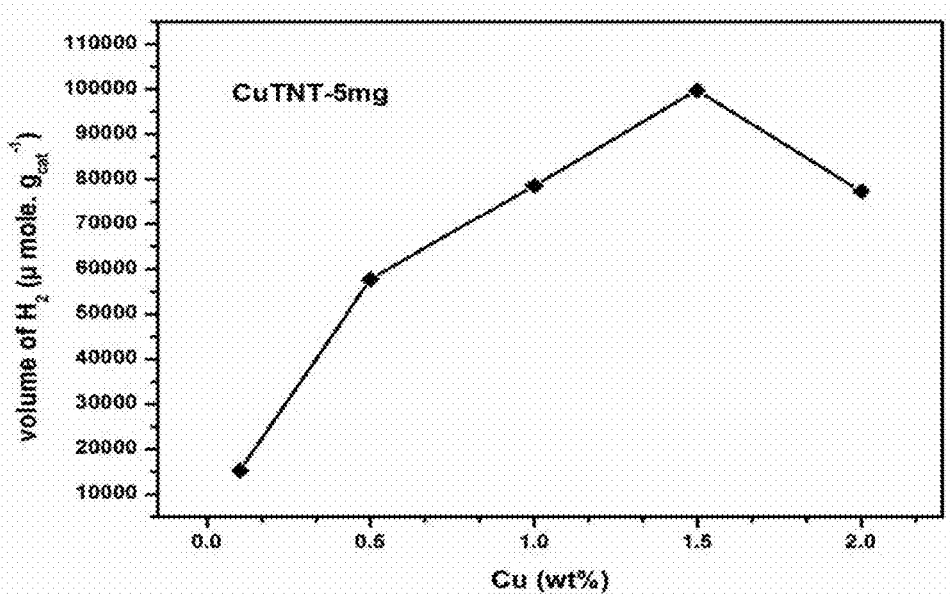
FIG. 7 is effect of copper loading on photocatalytic activity of CuO/TiO$_2$ nanotubes for hydrogen generation under solar light irradiation.
Figure 8:
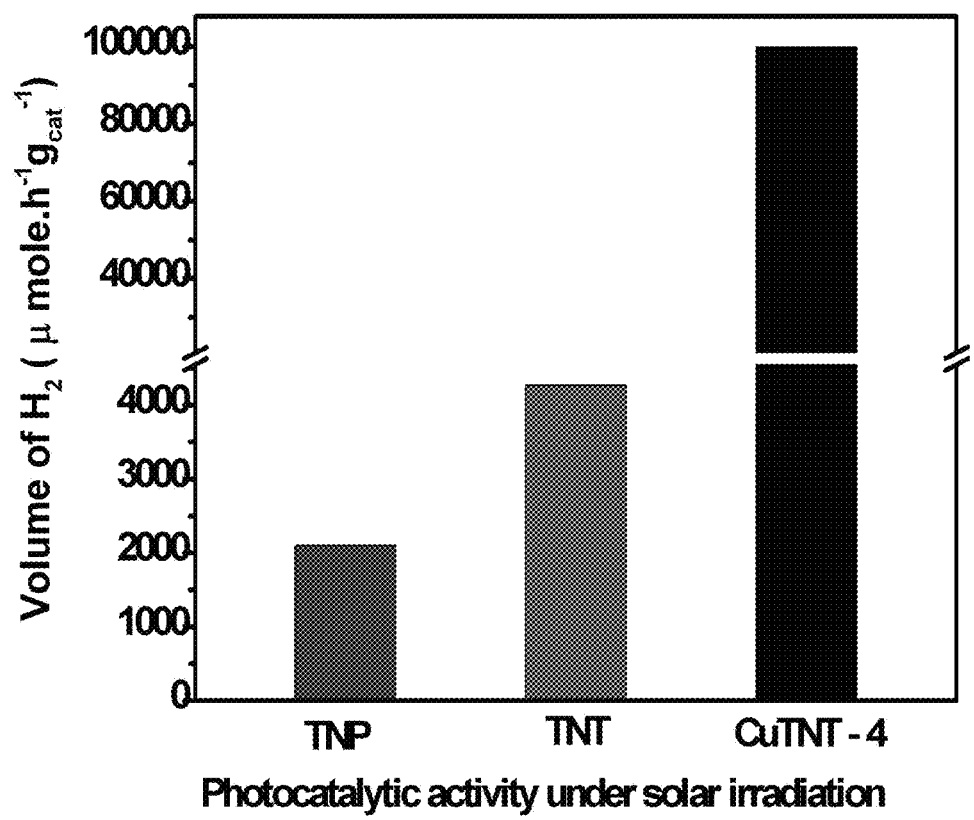
FIG. 8 is comparison of photocatalytic activity for hydrogen generation over TiO$_2$ nanoparticles, TiO$_2$ nanotubes and CuO/TiO$_2$ nanotubes under solar light irradiation.
Figure 9:
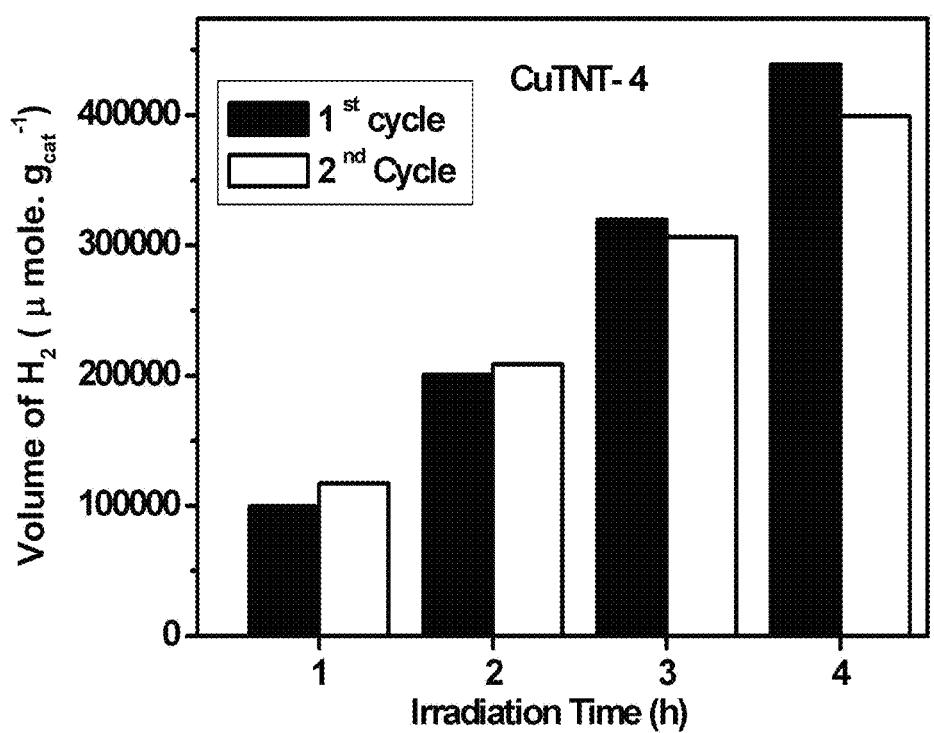
FIG. 9 is sustainability of the photocatalyst for repeated use.
Figure 10:
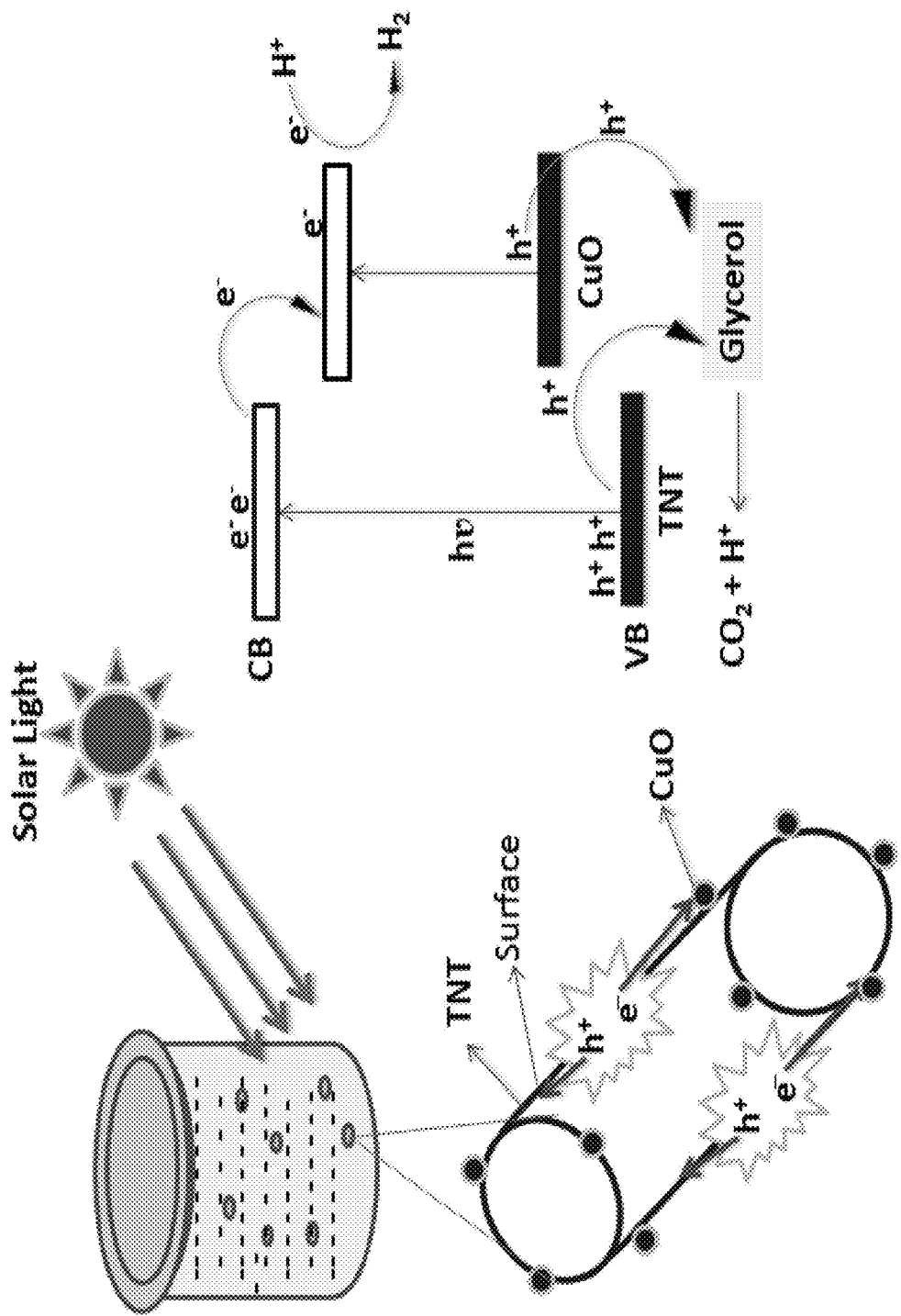
FIG. 10 is a pictorial illustration of band gap excitation and charge transfer processes in solar photocatalytic hydrogen generation.

Powdered photocatalyst (0.1 g) was suspended in 5 vol. % glycerol-water mixture (50 mL). In order to have better adsorption by the reaction mixture, it was magnetically stirred for 1 h at 32±2° C. under dark condition by covering with aluminium foil followed by evacuation and purged with N2 gas. Further, solar Photocatalytic experiments were conducted after removal of aluminium foil and kept on a four point magnetic stirrer (up to 4 quartz reactors can be accommodated for solar experiments) to ensure homogeneity of the suspension during reaction. FIG. 7 displays optimization of copper with TNT catalysts for efficient H$_2$ generation. It is observed that increase in copper loading results in higher H$_2$ production up to 1 wt %, beyond which the opposite effect was observed. Above the monolayer dispersion, agglomeration of copper species on nanotubes surface may produce large size CuO nanoparticles having low band potential, which is inefficient for H$_2$ production besides light screening effect. At optimized conditions H$_2$ production rate was found to be 9,389 µmoles h$^{-1}$ g$^{-1}_{cat}$. Thus produced gases were collected at fixed intervals (every 1 h) and analysed using an off-line Gas Chromatograph with TCD detector (Shimadzu GC-2014 with Molecular Sieve/5 A) using N$_2$ as a carrier gas.

Table 1 below is comparison of H$_2$ production rates. Table. 1 shows comparison of hydrogen production rates with reported photocatalyst. It is clear that highest amount of hydrogen is reported in this invention under solar light irradiation compared to all the reports. Further, under similar conditions, the CuO/TiO$_2$ nanotubes (Cu-TNT-4) exhibited nearly 5 times higher efficiency in comparison with Cu$_2$O/TiO$_2$ nanoparticles.

TABLE 1

| Sl. No | Photocatalyst | Scavenger | Light Source | Rate of Hydrogen µmol · h$^{-1}$ · g$^{-1}_{cat}$ |
|---|---|---|---|---|
| 1. | NiO/NaTaO$_3$:La | Methanol | Hg | 38400 |
| 2. | Pt/TiO$_2$ | Methanol | Hg | 21350 |
| 3. | CuO/TiO$_2$ nanotube | Methanol | Hg | 71600 |
| 4. | Ag$_2$O/TiO$_2$ | Methanol | Solar | 3350 |
| 5. | Cu$_2$O/TiO$_2$ | Glycerol | Solar | 20060 |
| 6. | CoO/TiO$_2$ | Glycerol | Solar | 11021 |
| 7. | CuO/TiO$_2$ nanotube (Cu-TNT-4) | Glycerol | Solar | 99823 |

ADVANTAGES OF THE INVENTION

A novel nano composite photocatalyst composed of cheap, earth abundant and eco-friendly materials such as TiO$_2$ and CuO.

The reaction conditions and experimental procedure for synthesis and processing of TiO$_2$ nanotube, CuO/TiO$_2$ nanocomposites are novel in the present investigation.

The solar photocatalytic activity measurements involve optimization of catalyst amount for highly efficient hydrogen production is novelty in the present investigation.

Utilization of bio-diesel industry by-product (about 10 wt %) glycerol as a cheap hole scavenger, for environment friendly potentially economical process.

The bi-crystalline nature of TiO$_2$ nanotube (Anatase+ Rutile mixture), its one dimensional morphology, influence of CuO as co-catalyst and solar light harvesting from UV-A and Visible light showed synergetic effects for enhanced H$_2$ production.

What is claimed is:

1. A process for H$_2$ production from glycerol-water mixture using a CuO—TiO$_2$ nanocomposite photocatalyst comprising TiO$_2$ nanotubes in the range of 98-99.9 wt % and CuO in the range of 0.1 to 2 wt %, wherein the said process comprises stirring the CuO—TiO$_2$ nanocomposite photocatalyst with a glycerol-water mixture (3 to 7 vol. %) for a period ranging between 0.5 to 2 h under dark conditions at a temperature ranging between 28-34° C. followed by evacuation and purged with N$_2$ gas subsequently stirring the solution under solar light for a period ranging between 1 to 4 h to obtain H$_2$ gas.

2. The process as claimed in claim 1, wherein H$_2$ production rate is in the range of 82,746 to 99,823 µmol·h$^{-1}$·g$^{-1}$ catalyst.

* * * * *